United States Patent
Brun et al.

(10) Patent No.: US 12,019,988 B2
(45) Date of Patent: Jun. 25, 2024

(54) MULTILINGUAL, END-TO-END-ASPECT BASED SENTIMENT ANALYSIS WITH OPINION TRIPLETS PREDICTIONS

(71) Applicant: NAVER CORPORATION, Gyeonggi-do (KR)

(72) Inventors: Caroline Brun, Grenoble (FR); Salah Aït-Mokhtar, Montbonnot-Saint-Martin (FR); Roman Castagne, Mallemort (FR)

(73) Assignee: NAVER CORPORATION, Gyeonggi-Do (KR)

(*) Notice: Subject to any disclaimer, the term of this patent is extended or adjusted under 35 U.S.C. 154(b) by 372 days.

(21) Appl. No.: 17/550,655

(22) Filed: Dec. 14, 2021

(65) Prior Publication Data
US 2022/0245343 A1    Aug. 4, 2022

(30) Foreign Application Priority Data
Feb. 2, 2021 (EP) ..................... 21305139

(51) Int. Cl.
*G06F 40/284* (2020.01)
*G06F 40/30* (2020.01)
*G06N 3/08* (2023.01)

(52) U.S. Cl.
CPC ............ *G06F 40/284* (2020.01); *G06F 40/30* (2020.01); *G06N 3/08* (2013.01)

(58) Field of Classification Search
CPC ................................ G06F 40/30; G06F 40/284
See application file for complete search history.

(56) References Cited

U.S. PATENT DOCUMENTS

2021/0089936 A1* 3/2021 Zhao ................ G06N 3/006
2021/0312135 A1* 10/2021 Meng ................ G06N 3/02

OTHER PUBLICATIONS

Joint Learning for Aspect Category Detection and Sentiment Analysis in Chinese Reviews, Zeng et al. CCIR 2019 (Year: 2019).*
Aspect Category Sentiment Analysis with Self-Attention Fusion Networks, Zelin Huang et al., DASFAA2020, pp. 154-168 (Year: 2020).*

(Continued)

*Primary Examiner* — Thomas H Maung (57) ABSTRACT

A computer-implemented method for training a neural end-to-end aspect based sentiment analysis (ABSA) system includes: inputting a batch of samples of a dataset into the neural end-to-end ABSA system, where the neural end-to-end ABSA system includes: a contextual language encoder configured to embed tokens with context; a first self-attention network configured to, based on an output of the contextual language encoder, detect an aspect term and provide a first output corresponding to the aspect term; and a second self-attention network configured to, based on the output of the contextual language encoder, detect the aspect term and provide a second output corresponding to the aspect term; and based on the inputted batch of samples and a consistency loss function, selectively adjusting weights of the neural end-to-end ABSA system based on consistent aspect term detection by the first self-attention network and the second self-attention network.

19 Claims, 4 Drawing Sheets

(56) References Cited

OTHER PUBLICATIONS

Alexander Rietzler, Sebastian Stabinger, Paul Opitz, and Stefan Engl. Adapt or get left behind: Domain adaptation through BERT language model finetuning for aspect-target sentiment classification. arXiv preprint arXiv:1908.11860. 2019.
Alexis Conneau, Kartikay Khandelwal, Naman Goyal, Vishrav Chaudhary, Guillaume Wenzek, Francisco Guzman, Edouard Grave, Myle Ott, Luke Zettlemoyer, and Veselin Stoyanov. Unsupervised cross-lingual representation learning at scale. arXiv preprint arXiv:1911.02116. 2019.
Ashish Vaswani, Noam Shazeer, Niki Parmar, Jakob Uszkoreit, Llion Jones, Aidan N Gomez, Łukasz Kaiser, and Illia Polosukhin. Attention is all you need. In Advances in neural information processing systems, pp. 5998-6008. 2017.
European Search Report for European Application No. 21305139.4 dated Jul. 23, 2021.
Hu Xu, Bing Liu, Lei Shu, and Philip S Yu. Bert post-training for review reading comprehension and aspect-based sentiment analysis. arXiv preprint arXiv:1904.02232. 2019.
Huaishao Luo, Tianrui Li, Bing Liu, and Junbo Zhang. Doer: Dual cross-shared rnn for aspect term-polarity co-extraction. arXiv preprint arXiv:1906.01794. 2019.
Ilya Loshchilov and Frank Hutter. Decoupled weight decay regularization. arXiv preprint arXiv:1711.05101. 2019.
Jacob Devlin, Ming-Wei Chang, Kenton Lee, and Kristina Toutanova. Bert: Pre-training of deep bidirectional transformers for language understanding. arXiv preprint arXiv:1810.04805. 2018.
Jimmy Lei Ba, Jamie Ryan Kiros, and Geoffrey E Hinton. Layer normalization. arXiv preprint arXiv:1607.06450. 2016.
Maria Pontiki, Dimitrios Galanis, Haris Papageorgiou, Ion Androutsopoulos, Suresh Manandhar, Mohammad Al-Smadi, Mahmoud Al-Ayyoub, Yanyan Zhao, Bing Qin, Orphée De Clercq, et al., SemEval-2016 Task 5: Aspect Based Sentiment Analysis. 10th International Workshop on Se1mantic Evaluation (SemEval 2016), Jun. 2016, San Diego, United States. ffhal-02407165.
Maria Pontiki, Dimitrios Galanis, Harris Papageorgiou, Suresh Manandhar, and Ion Androutsopoulos. Semeval-2015 task 12: Aspect based sentiment analysis. In Proceedings of the 9th international workshop on semantic evaluation (SemEval 2015), pp. 486-495. 2015.
Maria Pontiki, Dimitris Galanis, John Pavlopoulos, Harris Papageorgiou, Ion Androutsopoulos, and Suresh Manandhar. SemEval-2014 task 4: Aspect based sentiment analysis. In Proceedings of the 8th International Workshop on Semantic Evaluation (SemEval 2014). 2014.
Marzieh Saeidi, Guillaume Bouchard, Maria Liakata, and Sebastian Riedel. Sentihood: Targeted aspect based sentiment analysis dataset for urban neighbourhoods. arXiv preprint arXiv:1610.03771. 2016.
Matthew E Peters, Mark Neumann, Mohit Iyyer, Matt Gardner, Christopher Clark, Kenton Lee, and Luke Zettlemoyer. Deep contextualized word representations. arXiv preprint arXiv:1802.05365. 2018.
Md Shad Akhtar, Palaash Sawant, Sukanta Sen, Asif Ekbal, and Pushpak Bhattacharyya. Solving data sparsity for aspect based sentiment analysis using cross-linguality and multi-linguality. In Proceedings of the 2018 Conference of the North American Chapter of the Association for Computational Linguistics: Human Language Technologies, vol. 1 (Long Papers), pp. 572-582. 2018.
Minghao Hu, Yuxing Peng, Zhen Huang, Dongsheng Li, and Yiwei Lv. Open-domain targeted sentiment analysis via span-based extraction and classification. arXiv preprint arXiv:1906.03820. 2019.
Nitish Srivastava, Geoffrey Hinton, Alex Krizhevsky, Ilya Sutskever, and Ruslan Salakhutdinov. Dropout: a simple way to prevent neural networks from overfitting. The journal of machine learning research, 15(1):1929-1958. 2014.
Qingnan Jiang, Lei Chen, Ruifeng Xu, Xiang Ao, and Min Yang. A challenge dataset and effective models for aspect-based sentiment analysis. In Proceedings of the 2019 Conference on Empirical Methods in Natural Language Processing and the 9th International Joint Conference on Natural Language Processing (EMNLP-IJCNLP), pp. 6281-6286. 2019.
Ruidan He, Wee Sun Lee, Hwee Tou Ng, and Daniel Dahlmeier. "*An interactive multi-task learning network for end-to-end aspect-based sentiment analysis*". arXiv preprint arXiv:1906.06906. 2019.
Ruidan He, Wee Sun Lee, Hwee Tou Ng, and Daniel Dahlmeier. An unsupervised neural attention model for aspect extraction. In Proceedings of the 55th Annual Meeting of the Association for Computational Linguistics (vol. 1: Long Papers), pp. 388-397. 2017.
Sebastian Ruder, Parsa Ghaffari, and John G Breslin. Insight-1 at semeval-2016 task 5: Deep learning for multilingual aspect-based sentiment analysis. arXiv preprint arXiv:1609.02748. 2016.
Shikun Liu, Edward Johns, and Andrew J Davison. End-to-end multi-task learning with attention. In Proceedings of the IEEE Conference on Computer Vision and Pattern Recognition, pp. 1871-1880. 2019.
Soufian Jebbara and Philipp Cimiano. Zero-shot cross-lingual opinion target extraction. arXiv preprint arXiv:1904.09122. 2019.
Thomas Wolf, Lysandre Debut, Victor Sanh, Julien Chaumond, Clement Delangue, Anthony Moi, Pierric Cistac, Tim Rault, Rémi Louf, Morgan Funtowicz, et al. Transformers: State-of-the-art natural language processing. arXiv preprint arXiv:1910.03771. 2019.
Ting Gong, Tyler Lee, Cory Stephenson, Venkata Renduchintala, Suchismita Padhy, Anthony Ndirango, Gokce Keskin, and Oguz Elibol. A comparison of loss weighting strategies for multi-task learning in deep neural networks. IEEE Access, pp. 1-1, 09. 2019.
Xin Li, Lidong Bing, Piji Li, and Wai Lam. A unified model for opinion target extraction and target sentiment prediction. In Proceedings of the AAAI Conference on Artificial Intelligence, vol. 33, pp. 6714-6721. 2019a.
Xin Li, Lidong Bing, Wai Lam, and Bei Shi. Transformation networks for target-oriented sentiment classification. arXiv preprint arXiv:1805.01086. 2018.
Xin Li, Lidong Bing, Wenxuan Zhang, and Wai Lam. Exploiting BERT for end-to-end aspect-based sentiment analysis. arXiv preprint arXiv:1910.00883. 2019b.
Xin Li, Lidong Bing, Wenxuan Zhang, Wai Lam in "Exploiting BERT for End-to-End Aspect-based Sentiment Analysis", proceedings of the 5th Workshop on Noisy User-generated Text W-NUT 2019a.
Yan Zhou, Longtao Huang, Tao Guo, Jizhong Han, and Songlin Hu. A span-based joint model for opinion target extraction and target sentiment classification. In Proceedings of the 28th International Joint Conference on Artificial Intelligence, pp. 5485-5491. AAAI Press. 2019.
Zheng Li, Xin Li, Ying Wei, Lidong Bing, Yu Zhang, and Qiang Yang. Transferable end-to-end aspect [1] based sentiment analysis with selective adversarial learning. arXiv preprint arXiv:1910.14192. 2019c.
Zhiheng Huang, Wei Xu, and Kai Yu, in "Bidirectional lstm-crf models for sequence tagging", arXiv preprint arXiv:1508.0199 2015.
Zhilin Yang, Zihang Dai, Yiming Yang, Jaime Carbonell, Ruslan Salakhutdinov, and Quoc V. Le. XInet: Generalized autoregressive pretraining for language understanding. cite arxiv:1906.08237Comment: Pretrained models and code are available at https://github.com/zihangdai/xlnet. 2019.
Zhiqiang Toh and Jian Su. Nlangp at semeval-2016 task 5: Improving aspect based sentiment analysis using neural network features. In Proceedings of the 10th international workshop on semantic evaluation (SemEval[1]2016), pp. 282-288. 2016.

* cited by examiner

MULTILINGUAL, END-TO-END-ASPECT BASED SENTIMENT ANALYSIS WITH OPINION TRIPLETS PREDICTIONS

CROSS-REFERENCE TO RELATED APPLICATIONS

This application claims the benefit of European Application No. 21305139.4, filed on 2 Feb. 2021. The entire disclosure of the application referenced above is incorporated herein by reference.

FIELD

The present disclosure relates to aspect based sentiment analysis (ABSA) and more particularly to a neural end-to-end ABSA systems and methods for jointly discovering polarities and categories of aspect terms.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Sentiment analysis is a use case of natural language processing (NLP). Sentiment analysis assists in classifying the polarity of a given sentence or document. However, sentiment analysis may only captures coarse-grained sentiments at a global level. Aspect-Based Sentiment Analysis (ABSA) involves identifying fine-grained opinion polarity towards a specific aspect associated with a given target term (i.e., an aspect term). The ABSA task involves Aspect Term Detection (ATE), which involves detecting the aspect term or opinionated term, associated with the specific aspect, Aspect Polarity Detection (APD), which involves detecting polarity of the aspect/opinionated, and Aspect Category Detection (ACD), which involves detecting the domain-dependent category of the term, for instance SERVICE or DRINKS in the Restaurants domain. Work on ABSA may focus on ATE and APD.

ABSA may be divided in the subtasks of ATE, APD, and ACD, and then combined in a pipeline to perform whole opinion extraction. However, errors may be propagated from subtask to subtask. Moreover, evaluating the tasks separately, based on the ground truth of the previous task, as it is may be done for ABSA may be unrealistic and inefficient, as only performances on a complete extraction may be relevant for real world applications. Further, these systems may be extensive, expensive, and may require relatively large amounts of memory.

To alleviate one or more of the above, ABSA may be considered an end-to-end problem, for example by solving ATE and ACD in parallel, where each token is tagged individually with its position in the group and its polarity (positive, negative, neutral). However, all three sub-tasks of ABSA (target term extraction, aspect category determination, and sentiment detection) are not performed at once. ABSA systems may underperform, possibly due to there only being a small number of annotated examples of ABSA datasets for the training.

There is a need to address the problem of inefficient and underperforming ABSA systems and the training thereof. More concretely, in view of the problem of error propagation and inefficiency, there is a need for an improved ABSA system and an improved training method for such a system. This is of particular interest when deploying applications to real-world scenarios where an ABSA system is expected to detect an aspect term, an aspect polarity, and an aspect category with limited memory resources.

SUMMARY

Further areas of applicability of the present disclosure will become apparent from the detailed description, the claims and the drawings. The detailed description and specific examples are intended for purposes of illustration only and are not intended to limit the scope of the disclosure.

To address the challenges above, methods and systems for training a neural end-to-end aspect based sentiment analysis (ABSA) system with a dataset are disclosed.

In an embodiment, a computer-implemented method for training a neural end-to-end ABSA system with a dataset includes inputting a batch of samples of a dataset into the neural end-to-end ABSA system. The neural end-to-end ABSA system includes a contextual language model encoder for embedding tokens with context and a first self-attention network for detecting an aspect term and providing a first output corresponding to the aspect term and a second self-attention network for detecting the aspect term and providing a second output corresponding to the aspect term. An output of the contextual language model encoder is input into the first self-attention network and the second self-attention network. The method further includes adapting weights of the neural end-to-end ABSA system based at least in part on a first loss function and the inputted batch of samples. The first loss function includes a consistency loss function, which may consider a first probability of classifying a token as not being an aspect term by the first self-attention network and a second probability of classifying the token as not being an aspect term by the second self-attention network, to provide for consistent aspect term detection by the first self-attention network and the second self-attention network.

By adapting weights of the neural end-to-end ABSA system based at least in part on a first loss function including a consistency loss function to provide for consistent aspect term detection by the first self-attention network and the second self-attention network, and the inputted batch of samples, an improved method for efficiently training a neural end-to-end ABSA system that accurately detects aspect terms and provides outputs corresponding to the aspect term is provided. In addition, the training allows exploiting dependencies between the two tasks of the two self-attention networks that are mutually beneficial. Furthermore, the training method allows training small neural network systems regarding the number of parameters compared to other systems with a similar performance.

According to aspects, the training dataset includes a multi-lingual dataset. The neural end-to-end ABSA system may be trained for a single language, such as a target language, and a loss associated with one or more samples of a first language of the multilingual dataset for the training of the neural end-to-end ABSA system may be weighted based on a language similarity between the first language and the single language. The language similarity may be determined based on an F-score of a model, such as a neural end-to-end ABSA system, trained on the first language and evaluated on the single language. By training the neural end-to-end ABSA system on multilingual data, the method alleviates the problem of ABSA-labelled data scarcity.

In aspects, the neural end-to-end ABSA system is trained to output triplets including the aspect term, the first output including a category corresponding to the aspect term, and the second output including a polarity corresponding to the aspect term. A first self-attention network of the ABSA system and a second self-attention network of the ABSA system may be trained simultaneously. A contextual language model encoder of the ABSA system may be based on a pre-trained transformer. According to aspects, the neural end-to-end ABSA system is adapted based on a second loss function, where the second loss function weights a loss associated with the first self-attention network and a loss associated with the second self-attention network.

In an embodiment, a neural end-to-end ABSA system for predicting aspect categories and polarities includes a contextual language model encoder, a first self-attention network, and a second self-attention network. An output of the contextual language model encoder is a first input for the first self-attention network and a second input for the second self-attention network. The neural end-to-end ABSA system is configured to receive a sequence of tokens, embed, by the contextual language model encoder, tokens of the sequence of tokens with context into representations, extract, by the first self-attention network and the second self-attention network, an aspect term based on the representations, determine, by the first self-attention network, an aspect category of the aspect term, and determine, by the second self-attention network, a polarity of the aspect term. The neural end-to-end ABSA system may further be configured to output triplets including the aspect term, the aspect category, and the polarity.

In aspects, the contextual language model encoder is based on a multilingual contextual language model encoder. A first probability of classifying a token as not being an aspect term by the first self-attention network corresponds to a second probability of classifying the token as not being an aspect term by the second self-attention network, which provides for consistent aspect term detection by the first self-attention network and the second self-attention network.

In an embodiment, a neural end-to-end ABSA system for predicting at least one of aspect categories and polarities for a plurality of languages includes a multilingual encoder configured for embedding tokens of a sequence of tokens with context into representations, and at least one of a first self-attention network configured to associate an aspect category to a first aspect term from the representations, and a second self-attention network configured to associate a polarity to a second aspect term from the representations. The outputs of the first and second first self-attention network are merged under consistency constraints to output the final aspect term together with its aspect category and polarity.

In an embodiment, a computer-readable storage medium includes instructions which, when executed by a computer, cause the computer to carry out the steps of training a neural end-to-end ABSA system with a multilingual dataset. The neural end-to-end ABSA system includes a multilingual contextual language model encoder for embedding tokens with context into representations and is followed by at least one of a first self-attention network configured for detecting an aspect term and determining an aspect category of the aspect term based on the representations, and a second self-attention network for detecting the aspect term and determining a polarity of the aspect term based on the representations. The neural end-to-end ABSA system may be trained for one or more specific languages. The neural end-to-end ABSA system may be trained using a weighted loss based on language similarities between languages of the multilingual dataset and the one or more specific languages. The language similarities may be determined based on cross-lingual F-scores of a model, such as a neural end-to-end ABSA system, trained on at least one of the languages of the multilingual dataset and evaluated on the one or more specific languages.

In a further embodiment, a computer-readable storage medium having computer-executable instructions stored thereon is provided. When executed by one or more processors, the computer-executable instructions perform the method for training a neural end-to-end aspect based sentiment analysis, ABSA, system described above.

In a further embodiment, an apparatus including processing circuitry is provided. The processing circuitry is configured to execute a neural end-to-end aspect based sentiment analysis, ABSA, system described above.

In a feature, a computer-implemented method for training a neural end-to-end aspect based sentiment analysis (ABSA) system is described. The computer-implemented method includes: inputting a batch of samples of a dataset into the neural end-to-end ABSA system, where the neural end-to-end ABSA system includes: a contextual language encoder configured to embed tokens with context; a first self-attention network configured to, based on an output of the contextual language encoder, detect an aspect term and provide a first output corresponding to the aspect term; and a second self-attention network configured to, based on the output of the contextual language encoder, detect the aspect term and providing a second output corresponding to the aspect term; and based on the inputted batch of samples and a consistency loss function, selectively adjusting weights of the neural end-to-end ABSA system based on consistent aspect term detection by the first self-attention network and the second self-attention network.

In further features, the selectively adjusting weights includes selectively adjusting the weights of the end-to-end ABSA system based on (a) a first probability of classifying a token as not being an aspect term by the first self-attention network and (b) a second probability of classifying the token as not being an aspect term by the second self-attention network.

In further features, the dataset includes a multi-lingual dataset.

In further features, the method further includes: training the end-to-end ABSA system based on a first language; and selectively adjusting the weights of the end-to-end ABSA system based on a loss associated with samples of a second language that is different than the first language.

In further features, the method further includes selectively adjusting the weights of the end-to-end ABSA system further based on a weight value set based on a similarity between the first and second languages.

In further features, the weight value is set based on an F-score of a model trained on the first language and evaluated on the second language.

In further features, the selectively adjusting weights includes selectively adjusting the weights of the first self-attention network and the second self-attention network.

In further features, the selectively adjusting weights includes selectively adjusting the weights of the first self-attention network and the second self-attention network jointly.

In further features, the ABSA system is configured to, based on input text, output a triplet including (1) an aspect term in the input text, (2) a category associated with the aspect term, and (3) a polarity corresponding to the aspect term.

In further features, the contextual language encoder has the transformer architecture.

In further features, selectively adjusting weights includes selectively adjusting the weights based on a first loss associated with the first self-attention network and a second loss associated with the second self-attention network.

In a feature, a neural end-to-end aspect based sentiment analysis (ABSA) system includes: a contextual language encoder configured to generate encodings based on input text; a first self-attention network configured to, based on an output of the contextual language encoder, detect an aspect term in the input text and to determine a category associated with the aspect term; and a second self-attention network configured to, based on the output of the contextual language encoder, detect the aspect term in the input text and to determine a polarity associated with the aspect term, where the neural end-to-end ABSA system is configured to output a triplet including (1) the aspect term, (2) the category, and (3) the polarity.

In further features: the contextual language encoder is configured to receive a sequence of tokens and to encode the tokens with context to produce representations; the first self-attention network is configured to, based on the representations, detect the aspect term and determine the category; and the second self-attention network is configured to, based on the representations, detect the aspect term and determine the polarity.

In further features, the contextual language encoder is trained based on a multilingual dataset.

In further features, the contextual language encoder is configured to receive input text in a first language and is trained using text in a second language that is different than the first language.

In further features, the contextual language encoder is trained based on a weight value set based on a similarity between the first and second languages.

In further features, the weight value is set based on an F-score of a model trained on the second language and evaluated on the first language.

In further features, the contextual language encoder has the transformer architecture.

In further features, the first self-attention network and the second self-attention network are trained jointly.

In a feature, a computer-readable storage medium includes instructions which, when executed by one or more processors, cause the one or more processors to perform functions including: inputting a batch of samples of a dataset to a neural end-to-end ABSA system, where the neural end-to-end ABSA system includes: a contextual language encoder configured to embed tokens with context; a first self-attention network configured to, based on an output of the contextual language encoder, detect an aspect term and provide a first output corresponding to the aspect term; and a second self-attention network configured to, based on the output of the contextual language encoder, detect the aspect term and providing a second output corresponding to the aspect term; and based on the inputted batch of samples and a consistency loss function, selectively adjusting weights of the neural end-to-end ABSA system based on consistent aspect term detection by the first self-attention network and the second self-attention network.

In a feature, a computer-implemented method for training a neural end-to-end aspect based sentiment analysis (ABSA) system is described and includes: inputting a batch of samples of a dataset into the neural end-to-end ABSA system, where the neural end-to-end ABSA system includes: a contextual language encoder configured to embed tokens with context; a first self-attention network configured to, based on an output of the contextual language encoder, detect an aspect term and provide a first output corresponding to the aspect term; and a second self-attention network configured to, based on the output of the contextual language encoder, detect the aspect term and provide a second output corresponding to the aspect term; and based on the inputted batch of samples and a consistency loss function, selectively adjusting weights of the neural end-to-end ABSA system based on consistent aspect term detection by the first self-attention network and the second self-attention network.

In further features, the selectively adjusting weights includes selectively adjusting the weights of the end-to-end ABSA system based on (a) a first probability of classifying a token as not being an aspect term by the first self-attention network and (b) a second probability of classifying the token as not being an aspect term by the second self-attention network.

In further features, the dataset includes a multi-lingual dataset.

In further features, the computer-implemented method further includes: training the end-to-end ABSA system based on a first language; and selectively adjusting the weights of the end-to-end ABSA system based on a loss associated with samples of a second language that is different than the first language.

In further features, the computer-implemented method further includes selectively adjusting the weights of the end-to-end ABSA system further based on a weight value set based on a similarity between the first and second languages.

In further features, the weight value is set based on an F-score of a model trained on the first language and evaluated on the second language.

In further features, the selectively adjusting weights includes selectively adjusting the weights of the first self-attention network and the second self-attention network.

In further features, the selectively adjusting weights includes selectively adjusting the weights of the first self-attention network and the second self-attention network jointly.

In further features, the ABSA system is configured to, based on input text associated with one or more tokens, output a triplet including (1) the aspect term in the input text, (2) the first output corresponding to a category associated with the aspect term, and (3) the second output corresponding to a polarity associated with the aspect term.

In further features, the contextual language encoder has the transformer architecture.

In further features, selectively adjusting weights includes selectively adjusting the weights based on a first loss associated with the first self-attention network and a second loss associated with the second self-attention network.

In a feature, a neural end-to-end aspect based sentiment analysis (ABSA) system includes: a contextual language encoder configured to generate encodings based on input text; a first self-attention network configured to, based on an output of the contextual language encoder, detect an aspect term in the input text and to determine a category associated with the aspect term; and a second self-attention network configured to, based on the output of the contextual language encoder, detect the aspect term in the input text and to determine a polarity associated with the aspect term, where the neural end-to-end ABSA system is configured to output a triplet including (1) the aspect term, (2) the category, and (3) the polarity.

In further features: the contextual language encoder is configured to receive a sequence of tokens and to encode the tokens with context to produce representations; the first self-attention network is configured to, based on the representations, detect the aspect term and determine the category; and the second self-attention network is configured to, based on the representations, detect the aspect term and determine the polarity.

In further features, the contextual language encoder is trained based on a multilingual dataset.

In further features, the contextual language encoder is configured to receive input text in a first language and is trained using text in a second language that is different than the first language.

In further features, the contextual language encoder is trained based on a weight value set based on a similarity between the first and second languages.

In further features, the weight value is set based on an F-score of a model trained on the second language and evaluated on the first language.

In further features, the contextual language encoder has the transformer architecture.

In further features, the first self-attention network and the second self-attention network are trained jointly.

In a feature, a computer-readable storage medium including instructions which, when executed by one or more processors, cause the one or more processors to perform functions including: inputting a batch of samples of a dataset to a neural end-to-end ABSA system, where the neural end-to-end ABSA system includes: a contextual language encoder configured to embed tokens with context; a first self-attention network configured to, based on an output of the contextual language encoder, detect an aspect term and provide a first output corresponding to the aspect term; and a second self-attention network configured to, based on the output of the contextual language encoder, detect the aspect term and provide a second output corresponding to the aspect term; and based on the inputted batch of samples and a consistency loss function, selectively adjusting weights of the neural end-to-end ABSA system based on consistent aspect term detection by the first self-attention network and the second self-attention network.

The following detailed description and accompanying drawings provide a more detailed understanding of the nature and advantages of the present disclosure.

BRIEF DESCRIPTION OF THE DRAWINGS

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings.

The present disclosure will become more fully understood from the detailed description and the accompanying drawings, wherein.

In the drawings, reference numbers may be reused to identify similar and/or identical elements.

DETAILED DESCRIPTION

Described herein are systems and methods for training a neural end-to-end aspect based sentiment analysis (ABSA) system with a dataset. For purposes of explanation, numerous examples and specific details are set forth in order to provide a thorough understanding of the described embodiments. Embodiments as defined by the claims may include some or all of the features in these examples alone or in combination with other features described below, and may further include modifications and equivalents of the features and concepts described herein. The illustrative embodiments will be described with reference to the drawings wherein elements and structures are indicated by reference numbers. Further, where an embodiment is a method, steps and elements of the method may be combinable in parallel or sequential execution. As far as they are not contradictory, all embodiments described below can be combined with each other.

Aspect based sentiment analysis (ABSA) systems may identify fine-grained opinion polarity towards specific aspects associated with a given target term (i.e., aspect term). ABSA systems may detect terms together with their polarity or with their aspect categories. However, such ABSA systems do not extract joint information about aspect terms, aspect categories, and polarities, which may be referred to as opinion triplets.

The systems and methods herein model polarity (e.g., positive, negative, neutral, or conflict (i.e., both positive and negative)) and category (e.g., domain-dependent categories associated with POI (point of interest) categories (e.g., shopping, transportation, lodging, etc.)) signals jointly. Such systems and methods perform well on ABSA subtasks, while extracting full ABSA information (opinion triplets).

In embodiments, pre-trained contextualized word embeddings improve results on NLP tasks, which may be due to the rich syntactic and semantic information included in the pre-trained representations. Fine-tune training on downstream tasks may also be efficient. For example, a pre-trained language model BERT (bidirectional encoder representations from transformers) can be combined with a task specific head (e.g., a conditional random field (CRF) network, such as only linear, or a Self-Attention Network (SAN)) to label each token with a sequence annotation tagging scheme, such as the BIO (e.g., beginning [B], inside [I], outside/other [O]) format tagging scheme with a category tag and a polarity tag.

An example CRF network that may be used in embodiments herein as a task specific head is disclosed by Zhiheng Huang, Wei Xu, and Kai Yu, in "Bidirectional lstm-crf models for sequence tagging", arXiv preprint arXiv: 1508.0199 2015, which is incorporated herein by reference in its entirety. An example SAN that may be used in embodiments herein as a task specific head is disclosed by Xin Li, Lidong Bing, Wenxuan Zhang, Wai Lam in "Exploiting BERT for End-to-End Aspect-based Sentiment Analysis", proceedings of the 5th Workshop on Noisy User-generated Text (W-NUT 2019), which is incorporated herein by reference in its entirety.

Even though transfer learning may improve sample efficiency, the small number of annotated examples in ABSA datasets presents challenges. To alleviate this, fine-tuning pre-trained representations using in-domain data after the general pre-training task and before the task-specific fine-tuning step could be used. However, this leads to a increased computational cost and the need for a large amount of in-domain data, which may not always available in practice.

The present disclosure involves training in a multilingual context using a multilingual training dataset. Evaluation of this system using data in six different languages illustrates how non-parallel, multilingual data can help alleviate the issue of ABSA-labelled data scarcity.

Figure 1:
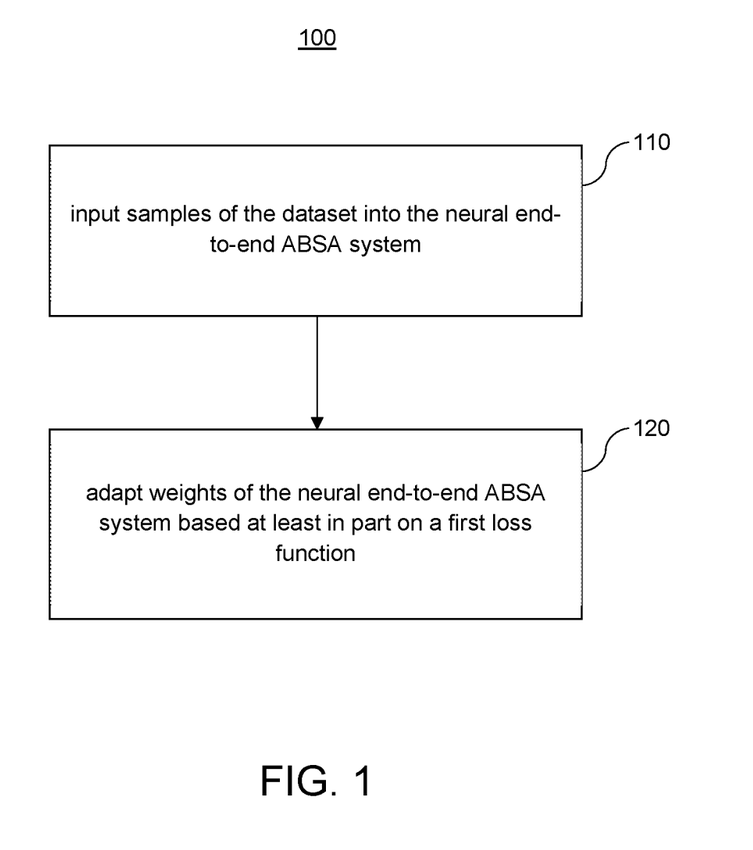
FIG. 1 illustrates a process flow diagram of a method for training a neural end-to-end aspect based sentiment analysis (ABSA) system.

FIG. 1 is a process flow diagram of an example method 100 of training a neural end-to-end aspect based sentiment analysis (ABSA) system with a dataset in accordance with an embodiment. The method may be performed by a training module.

At 110, the method includes inputting a batch of samples of a dataset into the neural end-to-end ABSA system. The neural end-to-end ABSA system includes a contextual language encoder module configured to embed tokens with context. Additionally, the neural end-to-end ABSA system includes: a first self-attention network module configured to detect an aspect term based on output of the contextual language encoder module and to provide a first output; and a second self-attention network module configured to detect the aspect term based on the output of the contextual language encoder module and to provide a second output. The contextual language encoder is followed by the first self-attention network and the second self-attention network, so that an output of the contextual language model encoder is input into the first self-attention network and the second self-attention network. The neural end-to-end ABSA system may be configured and trained to output triplets including: the aspect term, the first output including a category corresponding to the aspect term, and the second output including a polarity corresponding to the aspect term.

The contextual language encoder module may be based on a pre-trained transformer model and may be fine-tuned during the training. A transformer model has a transformer architecture and is a deep learning model and is configured to handle sequential data, such as natural language (e.g., sentences). The transformer architecture as used herein is described in Ashish Vaswani, Noam Shazeer, Niki Parmar, Jakob Uszkoreit, Llion Jones, Aidan N Gomez, Lukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety. While one example Transformer architecture is provided, the present application is also applicable to other Transformer architectures.

In contrast to recurrent neural networks (RNNs), such as the long short-term memory (LSTM), or models that process sequential data in order, transformer models do not require that the sequential data be processed in order. Due to this feature, the transformer model allows for much more parallelization than RNNs and therefore reduced training time. Examples of pre-trained transformer models include but are not limited to BERT (Bidirectional Encoder Representations from Transformers) models and GPT (Generative Pre-trained Transformer) models, which have been pre-trained with large general language datasets, such as Wikipedia Corpus, and can be fine-tuned to specific language tasks.

At 120, the method includes adapting weights of the neural end-to-end ABSA system based at least in part on a first loss function and the inputted batch of samples from the training dataset. The batch of samples may include one or more labeled samples, such as a labeled sequence of tokens or a labeled sentence. For example, a sentence may be labeled in accordance with a BIO format annotation. For the sentence "Italian pasta was great" the BIO annotation may be "Italian [B-Food] pasta [I-Food] was [O] great [O]" (i) for the category branch, (where "Food" is the category output by the category branch); and (ii) for the polarity branch the BIO annotation for the sentence may be: "Italian [B-Positive] pasta [I-Positive] was [O] great [O]" (where "Positive" is the polarity output by the polarity branch). 110 and 120 can be repeated until the training of the neural end-to-end ABSA system is complete, such as once a predetermined number of sets of samples have been input to the neural end-to-end ABSA system.

The first loss function considers a first probability of classifying a token as not being an aspect term by the first self-attention network and a second probability of classifying the token as not being an aspect term by the second self-attention network. This may help provide consistent aspect term detection by the first self-attention network and the second self-attention network. By using a consistency loss between the category and polarity outputs, the method encourages the first and second self-attention networks to agree on whether or not an aspect term has been detected.

The training dataset may include a multilingual dataset including samples of different languages. The neural end-to-end ABSA system may be trained for a single specific language. A loss associated with one or more samples of a first language of the dataset for the training of the neural end-to-end ABSA system may be weighted based on a language similarity between the first language and the single specific language. The language similarity may be determined based on an F-score of a model, such as a neural end-to-end ABSA system or a different ABSA model, trained on the first language and evaluated on the single specific language (that is different than the first language). The language similarity may be obtained from a lookup table indicating language similarities between different languages.

Multi-output learning can be beneficial. Either both tasks teach something to the network that benefits to the other task, or they compete for capacity of the network, biasing weights toward one or the other loss, which may decrease performance. Therefore, the neural end-to-end ABSA system may be adapted based at least in part on a second loss function to balance the losses corresponding to each output during the training. The second loss function weights a loss associated with the first self-attention network and a loss associated with the second self-attention network. For example, to balance the two losses, a dynamic weighted average (DWA) can be used. The first self-attention network and the second self-attention network are trained simultaneously (jointly).

The DWA balancing may not require accessing the intermediate layers of the neural end-to-end ABSA system. DWA involves determining weights $\lambda_t^i$ for the loss associated with task t, for all learning steps i with the following formula:

$$\lambda_t^i = K \frac{\exp(\omega_t^{i-1}/T)}{\sum_k \exp(\omega_k^{i-1}/T)} \quad (3)$$

and $$\omega_t^{i-1} = \frac{\mathcal{L}_t(i-1)}{\mathcal{L}_t(i-2)} \quad (4)$$

with t the task (categories or polarities), $\mathcal{L}_t$ the loss of that particular task, T a temperature parameter, K a scaling parameter, and i the training step. For $i \in \{0,1\}$, $\omega_t^{i-1}=1$ can be used. Other parameters can be set as K=1 so that $\forall i$ $\Sigma_t \lambda_t^i = 1$. The more the loss for task t decreases in the previous two instances, the lower $\omega_t^{i-1}$ is, and thus the lower the associated loss is. Intuitively, this may help the weakest loss (i.e. with the smallest decreasing rate) to improve.

The final loss for the multi-output network (e.g., the neural end-to-end ABSA system) at time step i is described by the following formula:

$$\mathcal{L} = \lambda_{pol}{}^i \mathcal{L}_{pol} + \lambda_{cat}{}^i \mathcal{L}_{cat} \quad (5)$$

Since the neural end-to-end ABSA system has two specific branches performing sequence tagging, one for polarities and one for categories, they detect the term twice, i.e., both detect whether a token is part of an aspect term or not. This could lead to inconsistencies between the two branches, where one branch would detect an aspect term and the other would not. Both branches can be forced (via the training) to yield the same token probabilities of not being an aspect term. To do that, a third loss (or consistency loss) described in equation 6 can be added and minimized during the training.

$$\mathcal{L}_{consistency} = -P_{pol}{}^x(y=0)\log(P_{cat}{}^x(y=0)) - (1-P_{pol}{}^x(y=0))\log(P_{cat}{}^x(y=0)) \quad (6)$$

with $P_{cat}{}^x$ and $P_{pol}{}^x$ the probability outputs of the category and polarity branches respectively, conditioned on an input sample x. This consistency loss corresponds to the binary cross entropy between the outputs of the two branches. The consistency loss may force the probability of "not being a term" predicted by the category classification branch to be the same as the one predicted by the polarity classification branch.

Multilingual contextual embeddings and available multilingual data from SemEval 2016 may be used to assess whether the neural end-to-end ABSA system can perform zero shot cross lingual evaluation.

Zero-shot cross lingual evaluation includes assessing whether the neural end-to-end ABSA system, trained with monolingual data only, can still perform well when predicting aspect terms, polarities, and categories in a language unseen during fine-tuning. Multilingual pre-trained encoders, such as mBERT, yield representations for tokens and sentences that relatively aligned across languages and thus allow such inference. When applied on monolingual training data only, however, multilingual pre-trained encoders may underperform compared to strictly monolingual pre-trained encoders, such as BERT.

To alleviate the lack of training data, the present application involves using a greater number of samples in different languages for the training. This can improve performances on one target language. Two different training methods are disclosed.

A first training method includes that all samples or examples are fed randomly to the model (the neural end-to-end ABSA system) without any language-based discrimination. This trains the model (the neural end-to-end ABSA system) to perform well on all languages.

A second training method targets a single language $l_{target}$ and includes training the model (the neural end-to-end ABSA system) on a plurality of languages, and weighting a loss by a factor $\omega_l$ depending on the language l of the sample or example. $\omega_l$ is defined in equation 7 below, where $F_1(l_1 \rightarrow l_2)$ corresponds to an F-score of a model trained on a first language $l_1$ and evaluated on a second language $l_2$, $\alpha$ being a hyper-parameter.

$$\omega_l = \frac{F_1(l \rightarrow l_{target})^\alpha}{F_1(l_{target} \rightarrow l_{target})^\alpha} \quad (7)$$

The hyper-parameter helps to discriminate the respective contribution of the different languages: when $\alpha>1$, the loss value for languages with good performances on the target language may be significantly higher than for languages with poor performance, while with $\alpha<1$, all examples are treated equally with respect to the optimization. Depending on a, higher ratios of F-scores for different languages will be more discriminative ($\alpha>1$), or will result in similar weight values ($\alpha<1$).

Figure 2:
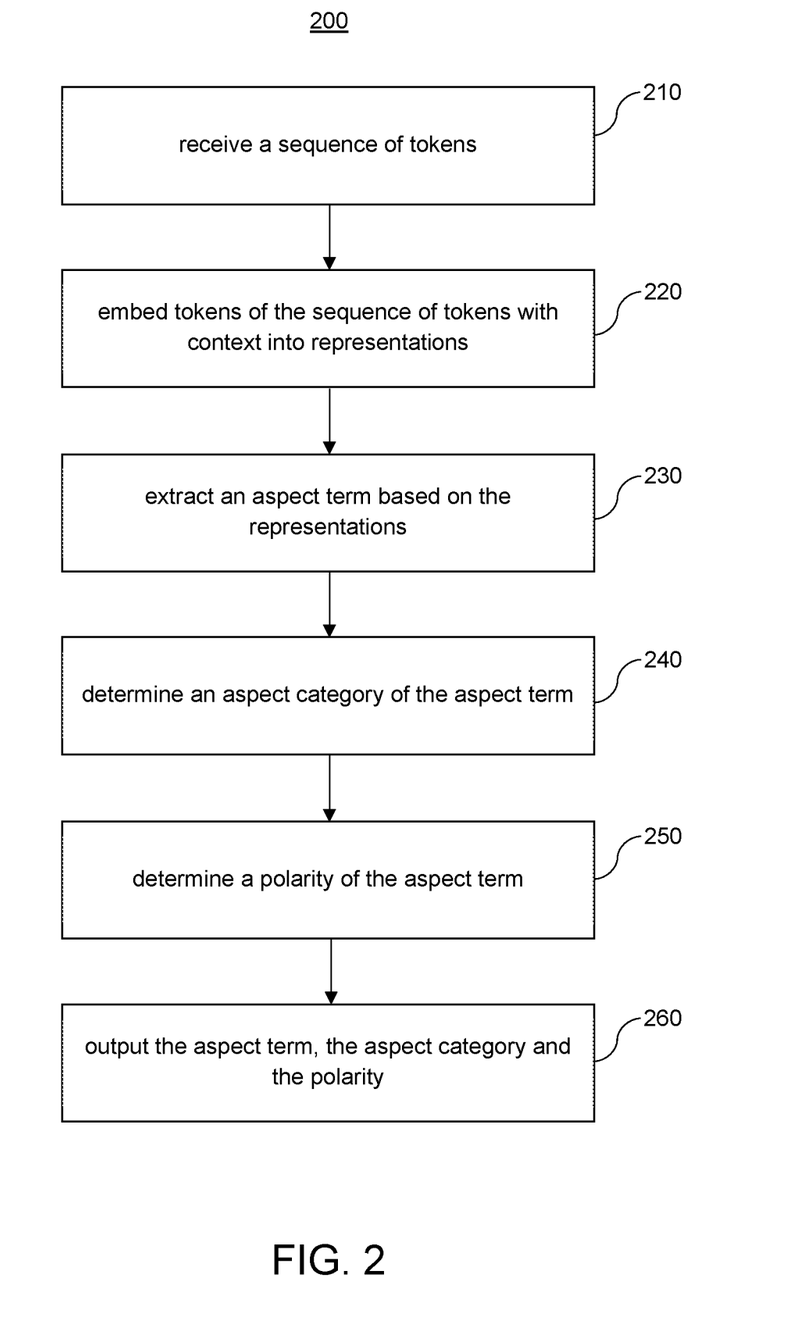
FIG. 2 illustrates a process flow diagram of a method for executing a neural end-to-end aspect based sentiment analysis (ABSA) system.

FIG. 2 is a process flow diagram of an example method 200 of predicting aspect categories and polarities by a neural end-to-end ABSA system. The neural end-to-end ABSA system may be trained in accordance with the method 100.

The neural end-to-end ABSA system includes a contextual language encoder (module), a first self-attention network (module), and a second self-attention network (module). The neural end-to-end ABSA system may be explained in more detail with respect to FIG. 4.

An output of the contextual language encoder includes a first input for the first self-attention network (first branch) and a second input for the second self-attention network (second branch). A first probability of classifying a token as not being an aspect term by the first self-attention network may correspond to or may approximately correspond to a second probability of classifying the token as not being an aspect term by the second self-attention network, to provide for consistent aspect term detection by the first self-attention network and the second self-attention network. The first and second self-attention networks may be trained to have approximately the same probabilities of classifying a token as not being an aspect term. In various implementations, the contextual language encoder may be based on a multilingual contextual language encoder.

The method 200 includes receiving a sequence of tokens, such as one or more sentences, at 210. A token in NLP may be a string of contiguous characters between two spaces, or between a space and punctuation marks. A token can additionally or alternatively be an integer or a number.

At 220, tokens of the sequence of tokens are embedded with context into representations by the contextual language encoder. The contextual language model encoder may have the transformer architecture.

At 230, an aspect term of the one or more sentences is extracted based on the representations. The aspect term may be detected twice, e.g., in the first branch and the second branch (by the first self-attention network and the second self-attention network). Based on the aspect term, an aspect category is determined at 240 (by one of the self-attention networks) and a polarity is determined at 250 (by the other one of the self-attention networks). The aspect category and the polarity may be determined in the first and the second branch, respectively. At 260, an opinion triplet is output. The opinion triplet includes (1) the aspect term, (2) the aspect category, and (3) the polarity, where the aspect category and polarity are consistent for the aspect term. consistent may mean appropriate. For example, as illustrated in FIG. 3, the aspect category of DRINKS is consistent for the aspect term wine list, and the polarity of positive is also consistent with the aspect term.

Figure 3:
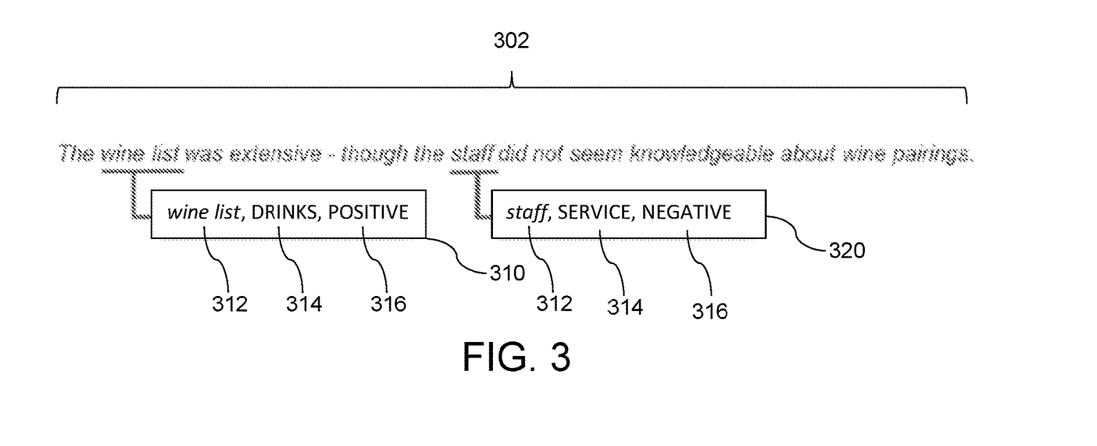
FIG. 3 illustrates an example of an opinion triplet detection.
Figure 4:
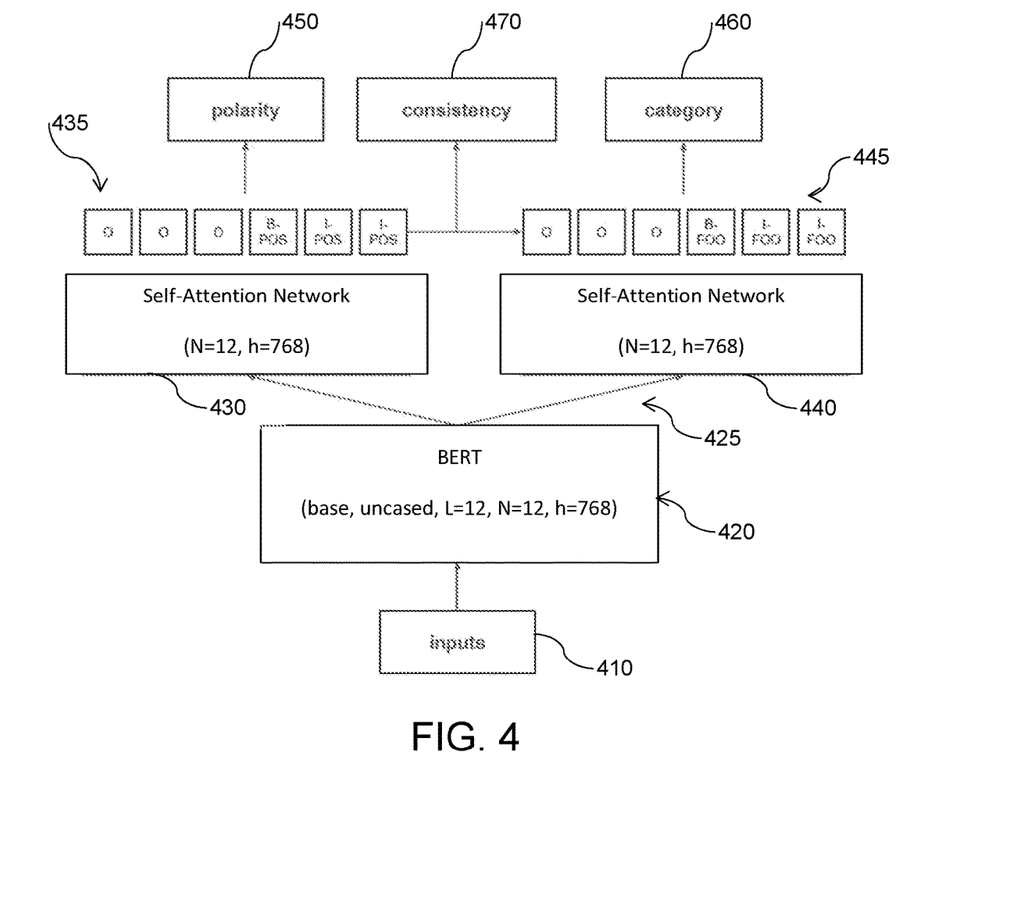
FIG. 4 illustrates an example architecture of a neural end-to-end ABSA system.

FIG. 3 illustrates an example of opinion triplet extraction in ABSA. The opinion triplets 310 and 320 may be extracted in accordance with the method 200 and include an aspect term 312, an aspect category 314, and a polarity 316 of the aspect term 312 of input text 302. The opinion triplets 310 and 320 are output by a multi-output architecture, such as the neural end-to-end ABSA system discussed herein, such as illustrated in FIG. 4. Specifically, as discussed above, the neural end-to-end ABSA system may include a contextual language (e.g., BERT) encoder and two self attention networks (SANs). One SAN is used to infer which polarity (if any) a current token (aspect term) reflects, and the other SAN estimates which aspect category (if any) the current token (aspect term) pertains to.

FIG. 4 illustrates an example architecture of the neural end-to-end ABSA system. The neural end-to-end ABSA system is configured to receive an input 410 (e.g., input text), such as a sequence of tokens (representing one or more sentences) that is input to a contextual language encoder 420 of the neural end-to-end ABSA system. The output of the contextual language encoder 420 are representations 425 that are input to a first self-attention network 430 and a second self-attention network 440. In various implementations, the representations 425 are defined by embedding context in tokens in the sequence of tokens (e.g., determined by neighboring tokens in the sequence of tokens).

The first self-attention network 430 and the second self-attention network 440 extract (detect) aspect terms 435 and 445, respectively, based on the representations 425. Further, the first self-attention network 430 and the second self-attention network 440 determine polarities 450 and categories 460 of the aspect terms, respectively.

In the example shown in FIG. 4, the aspect terms 435 and 445, respectively, are encoded using the BIO format, together with polarity (e.g., [O],[O],[O],[B-POS],[I-POS], [I-POS], where "POS" corresponds to the positive polarity), and category (e.g., [O],[O],[O],[B-FOO],[I-FOO],[I-FOO], where "FOO" corresponds to the food category). The neural end-to-end ABSA system uses one or more loss functions (e.g., the first loss function and the second loss function described above) to provide consistency 470 between the polarity 450 and the category 460 of aspect terms when generating outputs (triplets) including a composite (or final) aspect term 435/445, the polarity 450, and the category 460. In the example shown in FIG. 4, the aspect terms in the outputs may be encoded using the BIO format with an associated polarity and category (e.g., [O],[O],[O],[B-POS/FOO],[I-POS/FOO],[I-POS/FOO]).

In an embodiment of the neural end-to-end ABSA system, the contextual language encoder 420 may be a pretrained language model, such as the Bidirectional Encoder Representations from Transformers (BERT) encoder, to embed each token with their context. On top of the contextual language encoder 420 may be a task-specific layer 430/440, which can be trained with a dataset, such as the SemEval 2016 task 5 dataset or another suitable dataset. The task-specific layer 430/440 may include a self-attention network or layer, which may produce better results than conditional random fields and other types of layers. Self-attention networks (SAN) may use dot product attention with layer normalization, but no feed forward layer. The embeddings of the representations 425 of the sequence of tokens may be computed as follows:

$$\mathcal{H}_{SAN} = LayerNorm\left(\mathcal{H}_{in} + Softmax\left(\frac{\mathcal{H}_Q \mathcal{H}_K}{\sqrt{d}}\right)\mathcal{H}_V\right) \quad (1)$$

$$\mathcal{H}_Q = \mathcal{H}_{in}Q, \mathcal{H}_K = \mathcal{H}_{in}K, \mathcal{H}_V = \mathcal{H}_{in}V \quad (2)$$

With $\mathcal{H}_{in} \in \mathbb{R}^{n \times d}$ the input embeddings for the sequence of tokens (i.e. the output of 420), n the number of tokens embedded, d the dimension of the embeddings, and Q,K,V $\in \mathbb{R}^d$ the query, key and value matrices respectively.

This task specific layer 430/440 is duplicated in the neural end-to-end ABSA system, with one task specific layer 430/440 (e.g., 430) configured to perform polarity detection and the other task specific layer 430/440 (e.g., 440 configured to perform category detection. The contextual language encoder 420 may be shared by both classification heads (430 and 440). During optimization (fine-tuning), each example yields a loss value for both types of classification which may be used to optimize jointly every parameter from the neural end-to-end ABSA system to ensure consistency between polarity and category.

As an example, a simple baseline modeling end-to-end extraction of ABSA triplets may be used to compare the neural end-to-end ABSA system. To model all outputs, the BIO position prefix of each term is concatenated with its category and polarity. This has the disadvantage of multiplying the number of possible labels. For example, 6 different labels for categories, 3 for polarities, and each entity tagged with the BIO scheme, may result in 37 labels, some of which with very few training examples.

Compared to the model, where each classification type has very few task specific parameters, the neural end-to-end ABSA system described herein, which will be called ABSA system in the following, grants each head its own capacity at the final layer of the network to model complex situations. At the same time, having completely distinct models would not only result in an important total number of parameters but most importantly no shared information between tasks. In the model described herein, the shared encoder (420), which represents a large portion of the parameters of the model, still works with information from both tasks which may help extract better representations.

In experiments, a BERT-base-uncased version of BERT was used for the contextualized embeddings in the monolingual (en) setting and a BERT-base-multilingual-cased version was used for the multilingual setting. These pretrained models use 12 layers of Transformers with 12 heads in each layer and a hidden size of 768. The SAN layer on top of the encoder uses only a single layer with the same characteristics as BERT, 12 heads with hidden size 768. In the multilingual setting, XLM-RoBERTa-Large encoder may be used, which has 24 layers with 16 heads each, and uses a hidden size of 1027.

The model can be trained with a linearly decreasing learning rate by a training module. The training can start with a learning rate of $2 \cdot 10^{-5}$ and a batch size of 16 can be used. The model can be trained for 3,000 steps or another suitable number of steps, with early stopping on the validation F1 score. Given the small size of the dataset, each experiment can be run with five different initializations or another suitable number of initializations, and 10-fold cross validation can be used each time.

In Table 1 below, results on a test dataset are presented. 5 runs were used, using early stopping on a development set created with 10 fold cross validation. A different model named "Duplicate" is introduced as another naive baseline to predict polarities on one side and categories on the other.

TABLE 1

F1 scores for the different systems on the test set of SemEval 2016 "Restaurant reviews", averaged over five runs with different initializations. Standard deviations (in parenthesis) come from those five runs.

| System | #Params | Polarity | Category | <Term, Cat, Pol> |
|---|---|---|---|---|
| BERT + SAN (Li et al.) | 117M | 70.82 (0.43) | — | — |
| Duplicate (BERT + SAN) | 234M | 70.82 (0.43) | 75.58 (0.51) | — |
| Baseline | 117M | 70.63 (0.50) | 75.67 (0.46) | 68.15 (0.55) |
| ABSA system | 124M | 70.33 (0.41) | 75.58 (0.72) | 67.56 (0.57) |

"—" indicates that the task was not performed by the system.

Although the duplicate system yields slightly higher results on polarities, the system described herein is capable of extracting triplets with half the number of parameters, and similar performance. A high variance could be found over initializations, due to the limited number of training examples that limit the interpretability of results. Results on 10-fold cross-validation on the training dataset exhibited an opposite behavior, with the system described herein slightly above all other systems.

In order to assess the impact of the different techniques used in the neural end-to-end ABSA system described herein, an ablation study has been performed and the results are presented in Table 2 below. These results are obtained with 10-fold cross-validation, hence the differences with test results from Table 1 for the "base+(1)+(2)" model (the system described herein). For the baseline version, fixed weights for losses were used (instead of the Dynamic Weighted Average) and optimized using a hyper-parameter search. For the weights $\lambda_{pol}=0.55$ and $\lambda_{cat}=0.45$ was found to be the best performing weighting of losses.

TABLE 2

F1 scores on polarity and category detection and classification. Results on 10 fold cross validation using mean and standard deviation across five runs.

| System | Polarity | Category |
|---|---|---|
| base: BERT with SAN (fixed weights for losses) | 73.79 (0.20) | 77.03 (0.36) |
| base + (1) dynamic loss weighting | 73.65 (0.31) | 76.83 (0.35) |
| base + (2) logical dependencies | 73.47 (0.45) | 76.67 (0.48) |
| ABSA system: base + (1) + (2) | 73.93 (0.37) | 77.08 (0.50) |

The results show a slight advantage to using both strategies of dynamic loss weighting and logical dependencies combined, although the performance may be lower when used independently. High standard deviations show that the models may not be robust to different initializations.

The neural end-to-end ABSA system described herein may be trained using SemEval 2016 task 5 restaurant reviews. This dataset includes datasets in English (en), French (fr), Spanish (es), Dutch (nl), Russian (ru) and Turkish (tr).

The system performance of the neural end-to-end ABSA system may be evaluated on different languages. Multilingual contextual embeddings can be used to train the neural end-to-end ABSA system jointly on several languages and inference can be performed on languages unseen during training. The neural end-to-end ABSA system described herein may perform the three ABSA subtasks jointly, i.e., extracting opinion triplets relating target terms to their aspect category and polarity. Accordingly, joint zero shot cross lingual ATE, APD, and ACD, and augmentation of training data may be performed.

For zero shot cross lingual ABSA, multilingual training without discrimination, and multilingual training with language-based discrimination, the results are shown in Tables 3 to 5 below. Each score corresponds to the performance of a model trained on the language(s) of the vertical axis, and evaluated on the test set of the language of the horizontal axis. When targeting improved performances in a single target language, training on several languages helps, except for en, where 0.27 and 0.78 lower F1 scores may be observed for polarities and categories respectively. A gain may be observed on all other languages, especially on polarity classification, with a maximum gain over a single language training of 4.21 F1 points for tr. The scarcity of examples for Turkish may be the reason why additional data seems very valuable. en benefits from good representations from mBERT due to the large amount of English unlabeled data that can be used for training.

Weighting the loss depending on the target language yields small improvements over the baseline where each language has the same importance. The hyper-parameter a has been set to $\alpha=\{0.5; 1; 1.5; 2; 2.5; 3; 4\}$, where $\alpha=2$ may perform best. These improvements may be more important for categories than for polarities. One reason for this may be that embedding information for sentiments might be less language dependent than embeddings for aspects, e.g., food and drink, which benefit from similar languages with closer cultures. One downside may be the multiplication of models, since one model per target language is trained, instead of a single model handling several languages at once.

TABLE 3

F1 scores of the ABSA system described herein for polarities trained with mBERT on one or all languages and evaluated on the test set of single languages. "All weighted" means that language discrimination was performed. Results are averaged on five runs. Standard deviations come from different initializations.

Trained on:

| | | | | | | |
|---|---|---|---|---|---|---|
| all weighted | 68.41 ± 1.05 | 69.90 ± 0.69 | 64.99 ± 0.84 | 62.29 ± 1.23 | 62.97 ± 0.98 | 57.16 ± 1.46 |
| all | 67.63 ± 0.79 | 69.94 ± 1.02 | 64.75 ± 1.28 | 61.82 ± 0.59 | 62.98 ± 1.05 | 56.14 ± 2.09 |
| en | 67.90 ± 1.15 | 57.85 ± 1.27 | 46.68 ± 1.52 | 45.45 ± 2.16 | 45.84 ± 0.62 | 39.59 ± 4.77 |
| es | 51.55 ± 1.85 | 66.42 ± 0.51 | 48.80 ± 1.56 | 43.74 ± 1.01 | 40.50 ± 3.33 | 27.55 ± 3.98 |
| fr | 48.03 ± 1.97 | 59.38 ± 1.39 | 62.09 ± 1.37 | 40.33 ± 1.10 | 34.68 ± 2.15 | 29.18 ± 1.87 |
| nl | 43.41 ± 2.24 | 47.67 ± 3.15 | 42.48 ± 1.30 | 58.19 ± 1.25 | 29.50 ± 2.64 | 20.75 ± 3.56 |
| ru | 51.65 ± 1.19 | 53.33 ± 0.75 | 40.20 ± 1.83 | 42.34 ± 1.75 | 61.03 ± 0.88 | 37.95 ± 2.33 |

TABLE 3-continued

F1 scores of the ABSA system described herein for polarities trained with mBERT on one or all languages and evaluated on the test set of single languages. "All weighted" means that language discrimination was performed. Results are averaged on five runs. Standard deviations come from different initializations.

Trained on:

| | | | | | | |
|---|---|---|---|---|---|---|
| tr | 36.35 ± 2.81 | 41.71 ± 1.49 | 33.23 ± 1.49 | 30.30 ± 1.35 | 37.09 ± 2.98 | 51.93 ± 0.98 |
| Evaluated on: | en | es | fr | nl | ru | Tr |

TABLE 4

F1 scores of the ABSA system described herein for categories trained with mBERT on one or all languages and evaluated on the test set of single languages. "All weighted" means that language discrimination was performed. Results are averaged on five runs. Standard deviations come from different initializations.

Trained on:

| | | | | | | |
|---|---|---|---|---|---|---|
| all weighted | 73.05 ± 0.96 | 72.69 ± 0.56 | 74.09 ± 0.65 | 67.12 ± 0.47 | 72.85 ± 0.68 | 64.45 ± 1.24 |
| all | 72.53 ± 0.56 | 72.58 ± 0.52 | 73.44 ± 0.71 | 65.71 ± 0.83 | 72.19 ± 0.91 | 62.34 ± 1.19 |
| en | 73.31 ± 1.26 | 56.69 ± 1.28 | 56.33 ± 0.73 | 40.16 ± 2.83 | 45.58 ± 1.96 | 42.02 ± 2.95 |
| es | 52.02 ± 1.81 | 69.50 ± 0.60 | 57.51 ± 1.33 | 44.29 ± 1.28 | 44.89 ± 3.55 | 31.90 ± 3.12 |
| fr | 53.92 ± 1.06 | 58.33 ± 1.41 | 72.50 ± 1.13 | 44.39 ± 0.74 | 45.71 ± 1.11 | 35.59 ± 2.09 |
| nl | 46.00 ± 1.18 | 45.99 ± 1.83 | 47.84 ± 1.87 | 64.12 ± 1.12 | 31.21 ± 2.59 | 23.89 ± 4.70 |
| ru | 50.49 ± 0.97 | 45.60 ± 1.96 | 47.46 ± 1.69 | 44.39 ± 1.35 | 71.29 ± 0.46 | 38.96 ± 4.96 |
| tr | 36.83 ± 2.50 | 37.64 ± 2.07 | 40.25 ± 1.35 | 32.66 ± 2.40 | 39.01 ± 1.37 | 61.37 ± 1.43 |
| Evaluated on: | en | es | Fr | nl | Ru | tr |

TABLE 5

F1 scores of the ABSA system described herein for Triplets <Term, Cat, Pol> trained with mBERT on one or all languages and evaluated on the test set of single languages. "All weighted" means that language discrimination was performed. Results are averaged on five runs. Standard deviations come from different initializations.

Trained on:

| | | | | | | |
|---|---|---|---|---|---|---|
| all weighted | 63.80 ± 1.07 | 65.28 ± 0.83 | 60.72 ± 0.88 | 57.21 ± 1.29 | 59.94 ± 0.84 | 50.02 ± 1.15 |
| All | 63.05 ± 0.76 | 65.15 ± 0.94 | 60.02 ± 1.24 | 56.40 ± 0.76 | 59.48 ± 1.21 | 48.72 ± 2.50 |
| En | 63.60 ± 1.45 | 46.84 ± 1.26 | 39.02 ± 1.65 | 30.95 ± 2.66 | 34.41 ± 0.84 | 28.47 ± 3.73 |
| Es | 42.19 ± 2.03 | 60.56 ± 0.59 | 39.27 ± 1.79 | 33.22 ± 1.92 | 30.77 ± 2.81 | 18.93 ± 3.47 |
| Fr | 41.89 ± 1.38 | 47.96 ± 1.84 | 57.48 ± 1.37 | 31.27 ± 1.31 | 26.22 ± 1.60 | 20.00 ± 1.83 |
| Nl | 34.91 ± 1.95 | 35.44 ± 2.41 | 32.66 ± 1.24 | 51.29 ± 1.64 | 19.69 ± 2.39 | 14.40 ± 2.82 |
| Ru | 41.34 ± 0.67 | 35.68 ± 1.75 | 28.99 ± 1.80 | 32.83 ± 1.08 | 57.74 ± 1.09 | 27.25 ± 3.59 |
| Tr | 25.39 ± 2.18 | 25.90 ± 2.23 | 23.29 ± 1.10 | 20.51 ± 2.68 | 24.95 ± 1.91 | 45.18 ± 1.27 |
| Evaluated on: | en | es | fr | nl | ru | tr |

The ABSA system described herein has been evaluated with a different encoder, XLM-R. Results with these embeddings were obtained with the exact same setup as with mBERT and are presented in Tables 6 to 8 below. Using this encoder may yield gains on monolingual supervised training, e.g., 19.97 points improvement for the triplets <Term, Cat, Pol> for a model trained on tr and evaluated on tr. In the zero shot cross lingual setting, for instance a 36.16 points gain for triplets when training on en and evaluating on tr could be observed. This may be due to a better alignment in cross lingual representations in XLM-R than mBERT, thanks to more diverse data during the pre-training, better covering under represented languages like Turkish (tr).

The ABSA system trained with the XML-R encoder on English only is also compared with the ABSA system trained with monolingual BERT (Table 1) discussed above. The evaluation results on the English test set shows improvements on the F1 score with XML-R, on all tasks: +6.6 for polarities, +4.4 for categories, and +6.9 for triplets. Accordingly, multilingual embeddings can be a valuable alternative to monolingual embeddings for tasks such as ABSA.

TABLE 6

F1 scores of the ABSA system described herein, with XLM-R as encoder instead of mBERT, for the polarities.

Trained on:

| | | | | | | |
|---|---|---|---|---|---|---|
| all weighted | 79.50 ± 1.09 | 77.29 ± 0.38 | 76.81 ± 0.21 | 70.38 ± 1.39 | 73.81 ± 0.64 | 76.00 ± 1.22 |
| all | 79.00 ± 1.09 | 78.17 ± 0.38 | 75.19 ± 0.75 | 69.12 ± 0.52 | 73.74 ± 0.29 | 75.35 ± 1.53 |
| en | 76.92 ± 2.42 | 71.93 ± 1.42 | 63.89 ± 1.30 | 61.81 ± 1.27 | 65.91 ± 1.81 | 66.67 ± 1.64 |
| es | 60.35 ± 1.60 | 75.22 ± 0.89 | 63.85 ± 1.07 | 61.75 ± 1.58 | 62.93 ± 1.29 | 60.42 ± 1.01 |

TABLE 6-continued

F1 scores of the ABSA system described herein, with XLM-R
as encoder instead of mBERT, for the polarities.

Trained on:

| | | | | | | |
|---|---|---|---|---|---|---|
| fr | 59.91 ± 2.39 | 71.43 ± 1.09 | 72.25 ± 1.25 | 61.10 ± 0.95 | 61.29 ± 1.46 | 55.55 ± 3.51 |
| nl | 58.39 ± 3.17 | 66.18 ± 2.06 | 57.88 ± 1.41 | 68.34 ± 1.63 | 51.31 ± 3.01 | 39.55 ± 5.76 |
| ru | 70.87 ± 3.46 | 67.94 ± 1.95 | 61.66 ± 2.35 | 59.29 ± 1.34 | 71.14 ± 0.71 | 65.66 ± 1.83 |
| tr | 58.93 ± 1.93 | 55.29 ± 1.45 | 50.33 ± 1.70 | 50.54 ± 1.58 | 57.04 ± 1.85 | 70.40 ± 3.12 |
| Evaluated on: | en | es | fr | nl | ru | tr |

TABLE 7

F1 scores of the ABSA system described herein, with XLM-R
as encoder instead of mBERT, for the categories.

Trained on:

| | | | | | | |
|---|---|---|---|---|---|---|
| all weighted | 82.19 ± 0.94 | 78.63 ± 0.51 | 80.99 ± 0.96 | 71.42 ± 1.15 | 78.10 ± 0.36 | 76.43 ± 0.92 |
| all | 81.85 ± 0.48 | 78.57 ± 0.49 | 79.51 ± 1.24 | 71.27 ± 1.56 | 77.85 ± 0.48 | 74.21 ± 2.83 |
| en | 80.00 ± 2.30 | 72.29 ± 1.96 | 69.60 ± 0.59 | 62.68 ± 1.14 | 67.80 ± 2.10 | 63.69 ± 0.90 |
| es | 61.31 ± 1.73 | 74.70 ± 1.27 | 69.27 ± 0.97 | 60.82 ± 1.67 | 65.03 ± 1.34 | 59.37 ± 1.61 |
| fr | 63.78 ± 2.20 | 72.10 ± 0.89 | 77.61 ± 1.71 | 60.82 ± 1.20 | 64.96 ± 1.54 | 56.73 ± 2.27 |
| nl | 62.28 ± 2.33 | 67.46 ± 1.67 | 62.65 ± 1.08 | 70.82 ± 1.73 | 53.09 ± 1.64 | 39.08 ± 5.39 |
| ru | 73.38 ± 2.83 | 67.05 ± 1.32 | 67.49 ± 3.09 | 59.68 ± 0.78 | 76.26 ± 0.58 | 63.73 ± 2.01 |
| tr | 60.64 ± 1.64 | 56.57 ± 1.64 | 55.81 ± 1.57 | 50.57 ± 1.79 | 59.13 ± 2.02 | 69.89 ± 3.65 |
| Evaluated on: | en | es | fr | nl | ru | tr |

TABLE 8

F1 scores of the ABSA system described herein, with XLM-R as encoder
instead of mBERT, for the Triplets <Term, Cat, Pol>.

Trained on:

| | | | | | | |
|---|---|---|---|---|---|---|
| all weighted | 77.71 ± 1.18 | 74.48 ± 0.67 | 73.62 ± 0.60 | 66.20 ± 1.90 | 70.72 ± 0.66 | 72.96 ± 1.61 |
| all | 77.34 ± 0.92 | 74.63 ± 0.26 | 72.06 ± 0.79 | 65.54 ± 1.08 | 70.74 ± 0.50 | 70.04 ± 2.40 |
| en | 74.39 ± 2.52 | 67.06 ± 2.06 | 59.29 ± 1.08 | 56.89 ± 1.36 | 60.33 ± 2.31 | 59.54 ± 1.90 |
| es | 56.19 ± 2.07 | 70.80 ± 1.34 | 59.39 ± 1.38 | 55.74 ± 1.33 | 57.24 ± 1.51 | 55.09 ± 1.43 |
| fr | 57.61 ± 2.28 | 66.42 ± 1.33 | 68.71 ± 2.14 | 55.25 ± 1.37 | 56.45 ± 1.73 | 51.09 ± 3.13 |
| nl | 54.84 ± 2.99 | 61.11 ± 2.22 | 53.07 ± 1.16 | 62.60 ± 2.15 | 45.36 ± 2.20 | 33.58 ± 6.40 |
| ru | 68.09 ± 2.99 | 62.32 ± 1.78 | 58.15 ± 2.53 | 53.57 ± 1.03 | 68.52 ± 0.97 | 58.48 ± 2.58 |
| tr | 55.55 ± 2.05 | 52.93 ± 1.45 | 48.50 ± 1.58 | 47.04 ± 2.24 | 52.90 ± 2.02 | 65.15 ± 3.64 |
| Evaluated on: | en | es | fr | nl | ru | tr |

While some specific embodiments have been described in detail above, it will be apparent to those skilled in the art that various modifications, variations, and improvements of the embodiments may be made in light of the above teachings and within the content of the appended claims without departing from the intended scope of the embodiments. In addition, those areas in which it is believed that those of ordinary skill in the art are familiar have not been described herein in order to not unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the functions described may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like, e.g., a processor communicating with a memory, the means being configured to, or adapted to perform the methods described herein.

A further embodiment comprises a computer having installed thereon the computer program or instructions for performing one of the methods described herein.

Figure 5:
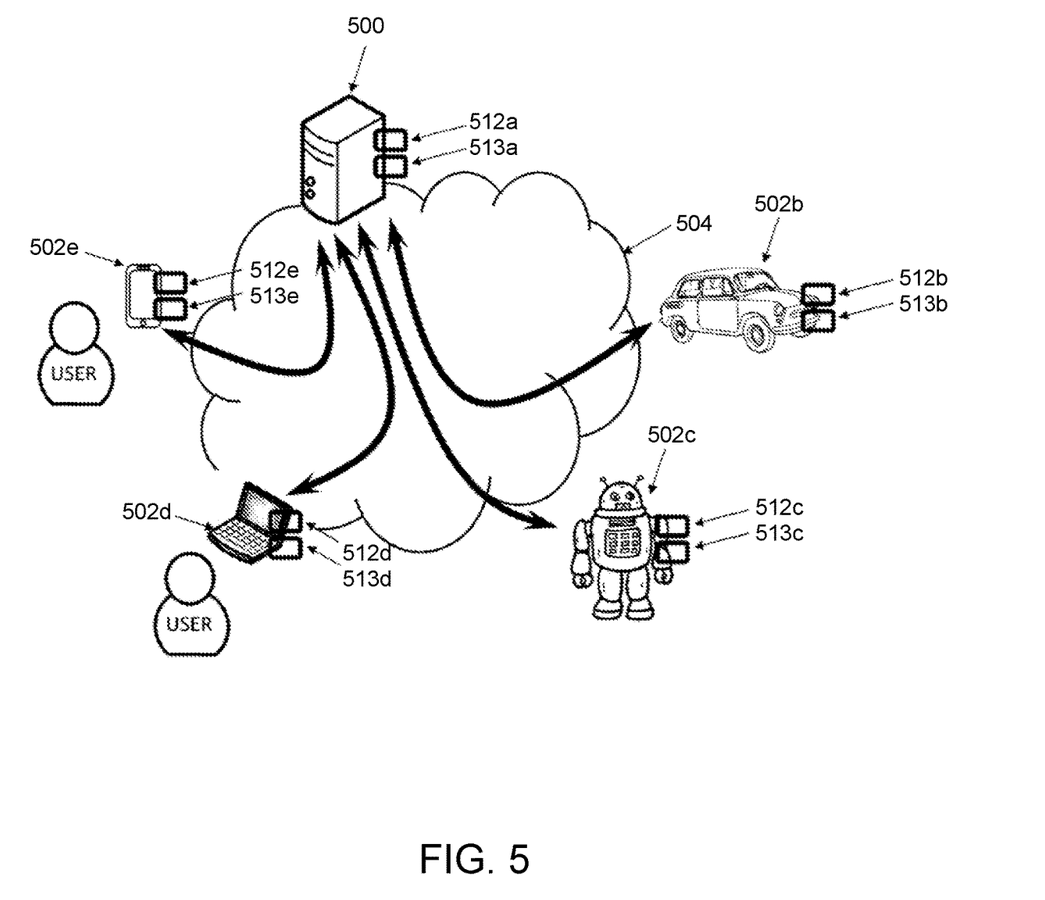
FIG. 5 illustrates an example architecture in which the disclosed systems and methods may be utilized.

The above-mentioned methods and embodiments may be implemented within an architecture such as illustrated in FIG. 5, which includes server 500 and one or more computing devices 502 (502a-502e) that communicate over a network 504 (which may be wireless and/or wired), such as the Internet for data exchange. The server 500 and the computing devices 502 each include a processor 512 (512a-512e) and memory 513 (513a-513e) such as a hard disk. The computing devices 502 may be any device that communicates with server 500, including autonomous vehicle 502b, robot 502c, computer 502d, cell phone 502e, or another type of computing device.

More precisely in an embodiment, the method according to the embodiment of FIG. 1 and/or FIG. 2 may be performed by server 500. In other embodiments, the methods according to the embodiments of FIG. 1 and/or FIG. 2 may be performed at computing device 502 partially or completely. In yet other embodiments, the methods may be performed at a different server or on a plurality of servers or computing devices in a distributed manner.

A novel single neural network for an end-to-end Aspect Based Sentiment Analysis (ABSA) multitask system that jointly discovers opinion triplets (term, polarity, category) in one or multiple languages, trained with a loss function integrating a penalty term for enforcing BIO tagging format (i.e., Beginning [B], Inside [I], Outside/Other [O]) for sequence annotation consistency is disclosed.

Consistency between the two branches (category/polarity) is evaluated because the branches can predict different things. Specifically, the consistency check examines that the category and polarity are associated with a term and the BIO sequence of the term are consistent between the branches. The trade-off of having two branches is that less labels are present, but inconsistent outputs are possible. Advantageously however a single network means that a large number of the network's weights are simultaneously trained and involved in computing all components of the tuple/triplet. Therefore in training, the loss function is defined such that it penalizes the cases where the output is inconsistent thereby forcing the two branches (category/polarity) to learn, and therefore produce, output that is consistent.

A second aspect concerns a single neural network for an end-to-end Aspect Based Sentiment Analysis (ABSA) multilingual multitask system that separately discovers polarities and/or categories (i.e., doubles or triples), trained using a weighted loss, which in one embodiment is the weighted loss set out in the first aspect, or another loss in other embodiments, based on language similarities between the target language and the source language of the training examples (i.e., a single opinion-tuple extraction network, using training data in multiple languages). A single network may mean that a large number of the network's weights are simultaneously trained and involved in computing all components of the tuple.

In particular, a neural, end-to-end ABSA system predicting both aspect categories and polarities in two output branches is disclosed. The system may be trained with a loss function integrating a penalty term for enforcing BIO tag consistency between the two outputs. Furthermore, a neural, end-to-end ABSA system predicting at least one of aspect categories and polarities for any language L is disclosed. The system may be trained on labelled, multi-lingual datasets using a weighted loss based on language similarities between L and the languages of the training examples, estimated from cross-lingual F1 scores.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method for training a neural end-to-end aspect based sentiment analysis (ABSA) system, the computer-implemented method comprising:
    inputting a batch of samples of a dataset into the neural end-to-end ABSA system,
    wherein the neural end-to-end ABSA system includes:
        a contextual language encoder configured to embed tokens with context;
        a first self-attention network configured to, based on an output of the contextual language encoder, detect an aspect term and provide a category output corresponding to the aspect term; and
        a second self-attention network configured to, based on the output of the contextual language encoder, detect the aspect term and provide a polarity output corresponding to the aspect term; and
    based on the inputted batch of samples and a consistency loss function that is based on (a) a first probability of classifying a token as not being an aspect term by the first self-attention network and (b) a second probability of classifying the token as not being an aspect term by the second self-attention network, selectively adjusting weights of the neural end-to-end ABSA system based on consistent aspect term detection by the first self-attention network and the second self-attention network.

2. The computer-implemented method of claim 1, wherein the dataset includes a multi-lingual dataset.

3. The computer-implemented method of claim 2, further comprising:
    training the end-to-end ABSA system based on a first language; and
    selectively adjusting the weights of the end-to-end ABSA system based on a loss associated with samples of a second language that is different than the first language.

4. The computer-implemented method of claim 3, further comprising selectively adjusting the weights of the end-to-end ABSA system further based on a weight value set based on a similarity between the first and second languages.

5. The computer-implemented method of claim 4, wherein the weight value is set based on an F-score of a model trained on the first language and evaluated on the second language.

6. The computer-implemented method of claim 1, wherein the selectively adjusting weights includes selectively adjusting the weights of the first self-attention network and the second self-attention network.

7. The computer-implemented method of claim 6, wherein the selectively adjusting weights includes selectively adjusting the weights of the first self-attention network and the second self-attention network jointly.

8. The computer-implemented method of claim 1, wherein the ABSA system is configured to, based on input text associated with one or more tokens, output a triplet including (1) the aspect term in the input text, (2) the category output corresponding to a category associated with the aspect term, and (3) the polarity output corresponding to a polarity associated with the aspect term.

9. The computer-implemented method of claim 1, wherein the contextual language encoder has the transformer architecture.

10. The computer-implemented method of claim 1, wherein selectively adjusting weights includes selectively adjusting the weights based on a first loss associated with the first self-attention network and a second loss associated with the second self-attention network.

11. A neural end-to-end aspect based sentiment analysis (ABSA) system comprising:
  a contextual language encoder configured to embed tokens with context and generate encodings based on input text;
  a first self-attention network configured to, based on an output of the contextual language encoder, detect an aspect term in the input text and to determine a category associated with the aspect term;
  a second self-attention network configured to, based on the output of the contextual language encoder, detect the aspect term in the input text and to determine a polarity associated with the aspect term,
  wherein the neural end-to-end ABSA system is configured to output a triplet including (1) the aspect term, (2) the category, and (3) the polarity and
  one or more processors configured to, based on the input text and a consistency loss function that is based on (a) a first probability of classifying a token as not being an aspect term by the first self-attention network and (b) a second probability of classifying the token as not being an aspect term by the second self-attention network, selectively adjust weights of the neural end-to-end ABSA system based on consistent aspect term detection by the first self-attention network and the second self-attention network.

12. The neural end-to-end ABSA system of claim 11 wherein:
  the contextual language encoder is configured to receive a sequence of tokens and to encode the tokens with context to produce representations;
  the first self-attention network is configured to, based on the representations, detect the aspect term and determine the category; and
  the second self-attention network is configured to, based on the representations, detect the aspect term and determine the polarity.

13. The neural end-to-end ABSA system of claim 11, wherein the contextual language encoder is trained based on a multilingual dataset.

14. The neural end-to-end ABSA system of claim 11, wherein the contextual language encoder is configured to receive input text in a first language and is trained using text in a second language that is different than the first language.

15. The neural end-to-end ABSA system of claim 14, wherein the contextual language encoder is trained based on a weight value set based on a similarity between the first and second languages.

16. The neural end-to-end ABSA system of claim 15, wherein the weight value is set based on an F-score of a model trained on the second language and evaluated on the first language.

17. The neural end-to-end ABSA system of claim 11, wherein the contextual language encoder has the transformer architecture.

18. The neural end-to-end ABSA system of claim 11, wherein the first self-attention network and the second self-attention network are trained jointly.

19. A computer-readable storage medium comprising instructions which, when executed by one or more processors, cause the one or more processors to perform functions including:
  inputting a batch of samples of a dataset to a neural end-to-end ABSA system,
  wherein the neural end-to-end ABSA system includes:
    a contextual language encoder configured to embed tokens with context;
    a first self-attention network configured to, based on an output of the contextual language encoder, detect an aspect term and provide a category output corresponding to the aspect term; and
    a second self-attention network configured to, based on the output of the contextual language encoder, detect the aspect term and provide a polarity output corresponding to the aspect term; and
  based on the inputted batch of samples and a consistency loss function that is based on (a) a first probability of classifying a token as not being an aspect term by the first self-attention network and (b) a second probability of classifying the token as not being an aspect term by the second self-attention network, selectively adjusting weights of the neural end-to-end ABSA system based on consistent aspect term detection by the first self-attention network and the second self-attention network.

* * * * *